US012643596B2

(12) United States Patent
Han

(10) Patent No.: US 12,643,596 B2
(45) Date of Patent: Jun. 2, 2026

(54) SENSOR MOUNTING STRUCTURE OF ELECTRIC POWER STEERING ASSIST APPARATUS AND ELECTRIC POWER STEERING APPARATUS HAVING THE SAME

(71) Applicant: HL MANDO CORPORATION, Pyeongtaek-si (KR)

(72) Inventor: Hyunsik Han, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 586 days.

(21) Appl. No.: 18/120,526

(22) Filed: Mar. 13, 2023

(65) Prior Publication Data

US 2023/0286572 A1      Sep. 14, 2023

(30) Foreign Application Priority Data

Mar. 14, 2022    (KR) ........................ 10-2022-0031231

(51) Int. Cl.
B62D 5/04          (2006.01)
B62D 15/02        (2006.01)

(52) U.S. Cl.
CPC ....... B62D 5/0454 (2013.01); B62D 15/0225 (2013.01)

(58) Field of Classification Search
CPC .................................................... B62D 5/0406
See application file for complete search history.

(56) References Cited

FOREIGN PATENT DOCUMENTS

| | | | | | |
|---|---|---|---|---|---|
| JP | 2012154432 | A | * | 8/2012 | |
| JP | 2015058756 | A | * | 3/2015 | |
| KR | 10-1537585 | B1 | | 7/2015 | |
| KR | 10-1549815 | B1 | | 9/2015 | |
| KR | 20220030688 | A | * | 3/2022 | ............... B62D 6/10 |

* cited by examiner

*Primary Examiner* — Kevin Hurley
(74) *Attorney, Agent, or Firm* — Hauptman Ham, LLP

(57)                ABSTRACT

Disclosed herein are a sensor mounting structure of an electric power steering apparatus and an electric power steering apparatus having the same. The sensor mounting structure of an electric power steering apparatus includes a housing having a first accommodation part of which one side surface is open to accommodate a worm wheel and a second accommodation part which communicates with the first accommodation part and accommodates a worm shaft, a sensing unit disposed such that the sensing unit is spaced a predetermined distance from and faces the worm wheel, and a fastening means which fixes the sensing unit to the housing.

14 Claims, 8 Drawing Sheets

1

SENSOR MOUNTING STRUCTURE OF ELECTRIC POWER STEERING ASSIST APPARATUS AND ELECTRIC POWER STEERING APPARATUS HAVING THE SAME

CROSS-REFERENCE TO RELATED APPLICATION

This application claims the benefit of Korean Patent Application No. 10-2022-0031231, filed on Mar. 14, 2022 in the Korean Intellectual Property Office, the disclosure of which is incorporated herein by reference.

BACKGROUND

1. Field

Embodiments of the present disclosure relate to a sensor mounting structure of an electric power steering apparatus and an electric power steering apparatus having the same, and more specifically, to a sensor mounting structure of an electric power steering apparatus, in which a sensor is easily installed, and an electric power steering apparatus having the same.

2. Description of the Related Art

A steering apparatus is an apparatus which controls a travel direction of a vehicle. Such a steering apparatus includes a steering gearbox including a rack and a pinion gear, a steering shaft for transmitting rotation of a handle to the pinion gear of the steering gearbox to cause the rack to laterally move, tie rods for connecting knuckle parts of both wheels and both ends of the rack of the steering gearbox, and the like.

Among steering apparatuses, there are electric power steering apparatuses to which a hydraulic or electric power apparatus for assisting a steering force is added. In this case, the electric power steering apparatus helps steering by rotating a steering shaft or laterally moving a rack using a motor.

FIG. 1 is a view illustrating a conventional electric power steering apparatus.

Referring to FIG. 1, an electric power steering apparatus 1 may include a worm wheel 2 and a worm shaft (not shown) to transmit power to a rack (not shown) through a pinion gear 3a. The worm shaft is provided to be engaged with the worm wheel 2 to transmit the power generated by a motor (not shown) to the worm wheel 2, and the worm wheel 2 is coupled to an output shaft 3, on which the pinion gear 3a is provided, and rotated according to rotation of the worm wheel 2. Accordingly, the rack engaged with the pinion gear 3a laterally moves to assist steering. The worm wheel 2 and the worm shaft are accommodated in a housing 4, one side surface of the housing 4 is open to accommodate the worm wheel 2, and a housing cover 5 closes the one side surface of the housing 4 and is coupled to the housing 4.

In addition, the electric power steering apparatus 1 may be controlled by an electronic control unit (ECU, not shown). For example, a driver's handle manipulation force is detected by a torque sensor, an angle sensor, and the like and transmitted to the ECU, and the motor is driven according to a signal detected by the ECU. Accordingly, a sensor 6 for detecting a rotation angle or rotation torque of the worm wheel 2 which operates as the motor is driven is provided. In this case, a torque angle sensor capable of detecting a torque and a rotation angle using one sensor may be used as the sensor 6.

The sensor 6 is disposed to face the worm wheel 2 and installed on the output shaft 3, wherein the sensor 6 is installed using a separate assembly tool T That is, the housing cover 5 is assembled after fixing the sensor 6 using the tool T In this case, when the sensor 6 is partially inserted into the housing cover 5 while being supported by the tool T, the housing cover 5 is assembled with the housing 4 after removing the tool T in the state.

However, as illustrated in FIG. 2, when the sensor 6 is installed using the tool T, a separation distance A is required between the tool T holding the sensor 6 and the housing 4 to prevent interference with the tool T. Due to the separation distance A being secured, a distance B between the worm wheel 2 and the sensor 6 increases, and thus there is a problem of being disadvantageous for packaging as well as increasing a total length of a product.

SUMMARY

Therefore, it is an aspect of the present disclosure to provide a sensor mounting structure of an electric power steering apparatus and an electric power steering apparatus having the same of which a total length is reduced and packaging performance is improved by improving an installation structure of a sensor when compared to a conventional case.

In accordance with one aspect of the present disclosure, a sensor mounting structure of an electric power steering apparatus includes a housing having a first accommodation part of which one side surface is open to accommodate a worm wheel and a second accommodation part which communicates with the first accommodation part and accommodates a worm shaft, a sensing unit disposed such that the sensing unit is spaced a predetermined distance from and faces the worm wheel, and a fastening means which fixes the sensing unit to the housing.

The fastening means may include a coupling part formed to protrude from a frame forming an exterior of the sensing unit, a fastening groove formed to be recessed in an inner surface of the first accommodation part, and a fastening member of which one end is coupled to the coupling part and the other end is coupled to the fastening groove.

The fastening member may include a body part, a fastening part formed to extend from one end of the body part and fitted into and coupled to the fastening groove, and a pair of supports formed to extend from the other end of the body part and support two side surfaces of the coupling part.

The coupling part may include a coupling body provided between the pair of supports and an elastic member formed on any one side surface of two side surfaces of the coupling body and provided to be elastically deformed when the pair of supports are coupled to the coupling body.

The elastic member may be integrally formed with the coupling body.

The elastic member may include a first elastic part formed to extend downward from an upper side of the coupling body to have an inclination and a second elastic part provided between the first elastic part and the coupling body to elastically support the first elastic part.

The first elastic part may include a bending part bent from the coupling body, an elastic arm formed to extend from the bending part, and a round part having a greater thickness than the elastic arm and formed on an end portion of the elastic arm.

The second elastic part may be formed to extend downward from the coupling body and may include a bent part bent from the coupling body, a first elastic contact part extending to be curved from the bent part and provided in contact with the coupling body, and a second elastic contact part extending to be curved from the first elastic contact part and provided in contact with the first elastic part.

In accordance with another aspect of the present disclosure, an electric power steering apparatus includes a housing including a first accommodation part of which one side surface is open to accommodate a worm wheel coupled to an output shaft and a second accommodation part which communicates with the first accommodation part and accommodates a worm shaft engaged with the worm wheel, a motor coupled to the worm shaft to provide a rotational force to the worm wheel through the worm shaft, a housing cover coupled to the one side surface of the first accommodation part, a sensing unit disposed such that the sensing unit is spaced a predetermined distance from and faces the worm wheel, and a fastening means described above.

BRIEF DESCRIPTION OF THE DRAWINGS

The present disclosure will be specifically described with reference to the following drawings, but since these drawings represent exemplary embodiments of the present disclosure, the technical spirit of the present disclosure should not be interpreted only by the drawings of which.

DETAILED DESCRIPTION

Figure 1:
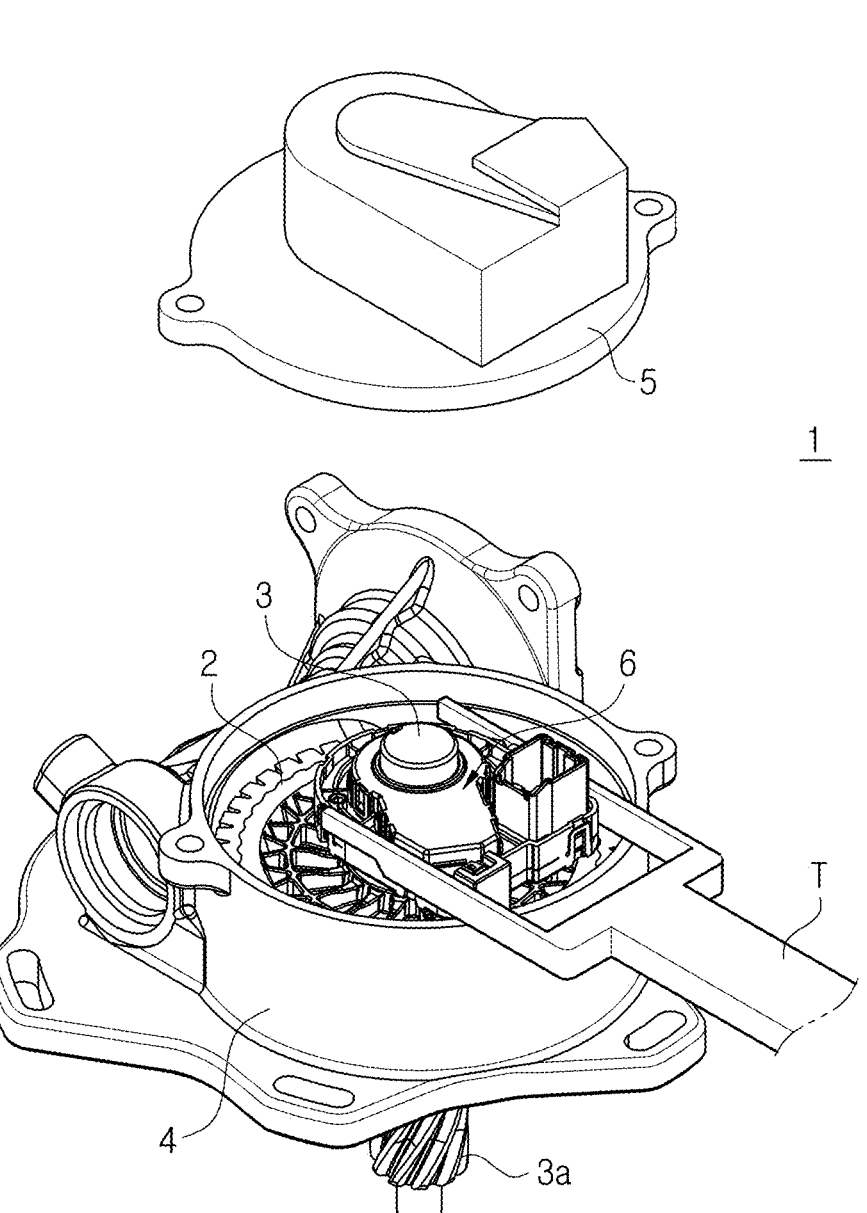
FIG. 1 is a schematic view illustrating a conventional electric power steering apparatus.
Figure 2:
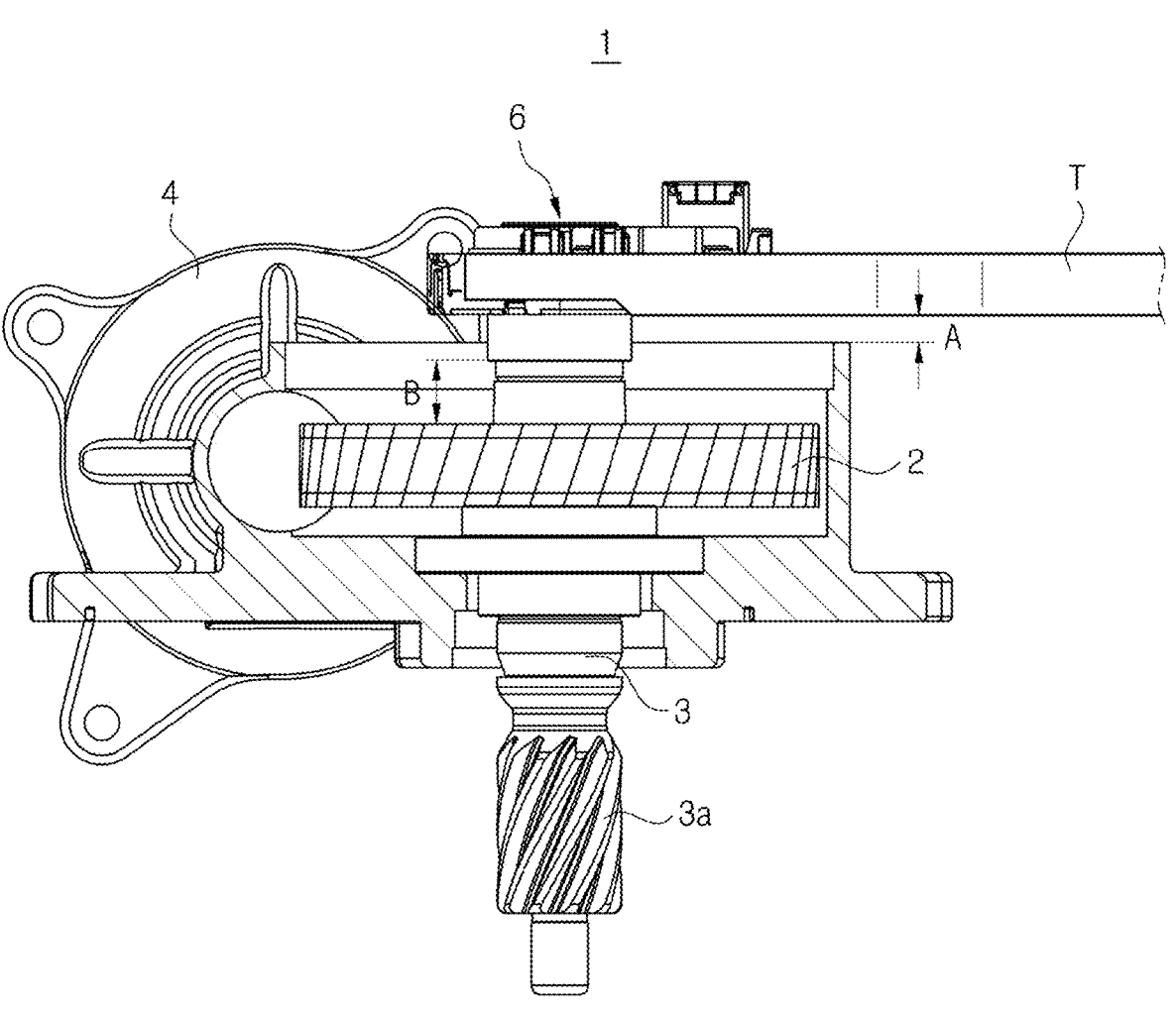
FIG. 2 is a view showing a conventional problem.

Hereinafter, embodiments of the present disclosure will be described in detail with reference to the accompanying drawings. The following embodiments are provided to sufficiently convey the spirit of the present disclosure to those skilled in the art. The present disclosure is not limited to the embodiments disclosed herein and can be implemented in different forms. In the drawings, portions which are not related to the description may be omitted for clarifying the present disclosure, and sizes of components may be exaggerated for facilitating understanding of the present disclosure.

Figure 3:
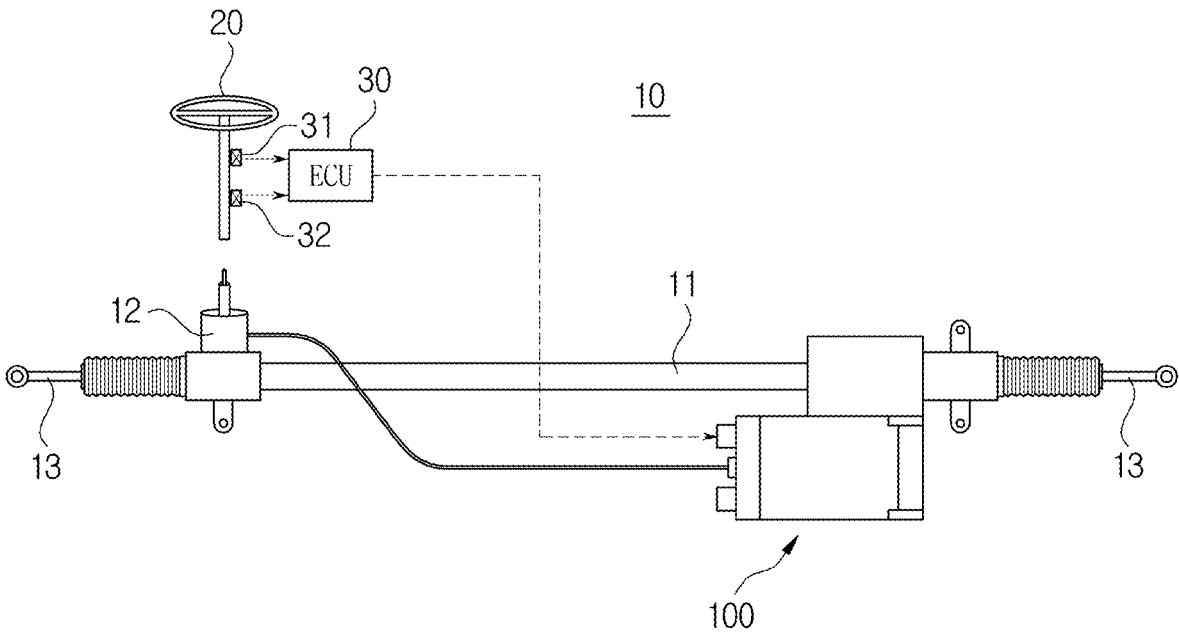
FIG. 3 is a view illustrating a steering apparatus to which an electric power steering apparatus is applied according to one embodiment of the present disclosure.

FIG. 3 is a view illustrating a steering apparatus to which an electric power steering apparatus is applied according to one embodiment of the present disclosure.

Referring to FIG. 3, a steering apparatus 10 may include a steering gearbox 11 in which a rack and a pinion gear 126

(see FIG. 5) are installed, a steering shaft connector 12 to which a steering shaft (not shown) is connected, tie rods 13 for connecting knuckle parts (not shown) of two wheels and two ends of the rack of the steering gearbox 11, and an electric power steering apparatus 100 which is installed on the steering gearbox 11 and operates the rack according to steering to transmit a steering force.

Referring to FIG. 3, the steering apparatus 10 may include a torque sensor 31 which detects a torque applied to a handle 20 by a driver and outputs the torque as an electrical signal, an angle sensor 32 which detects a rotation angle of the handle 20 and outputs an electrical signal as the rotation angle, and an electronic control unit (ECU) 30 for generating a control signal on the basis of the electrical signals output from the torque sensor 31 and the angle sensor 32. In this case, the ECU 30 controls a motor 130 (see FIG. 5) by comparing input signal values from the torque sensor 31 and the angle sensor 32 with preset data. That is, the electric power steering apparatus 100 may be controlled to generate power on the basis of the output signal of the ECU 30.

Figure 4:
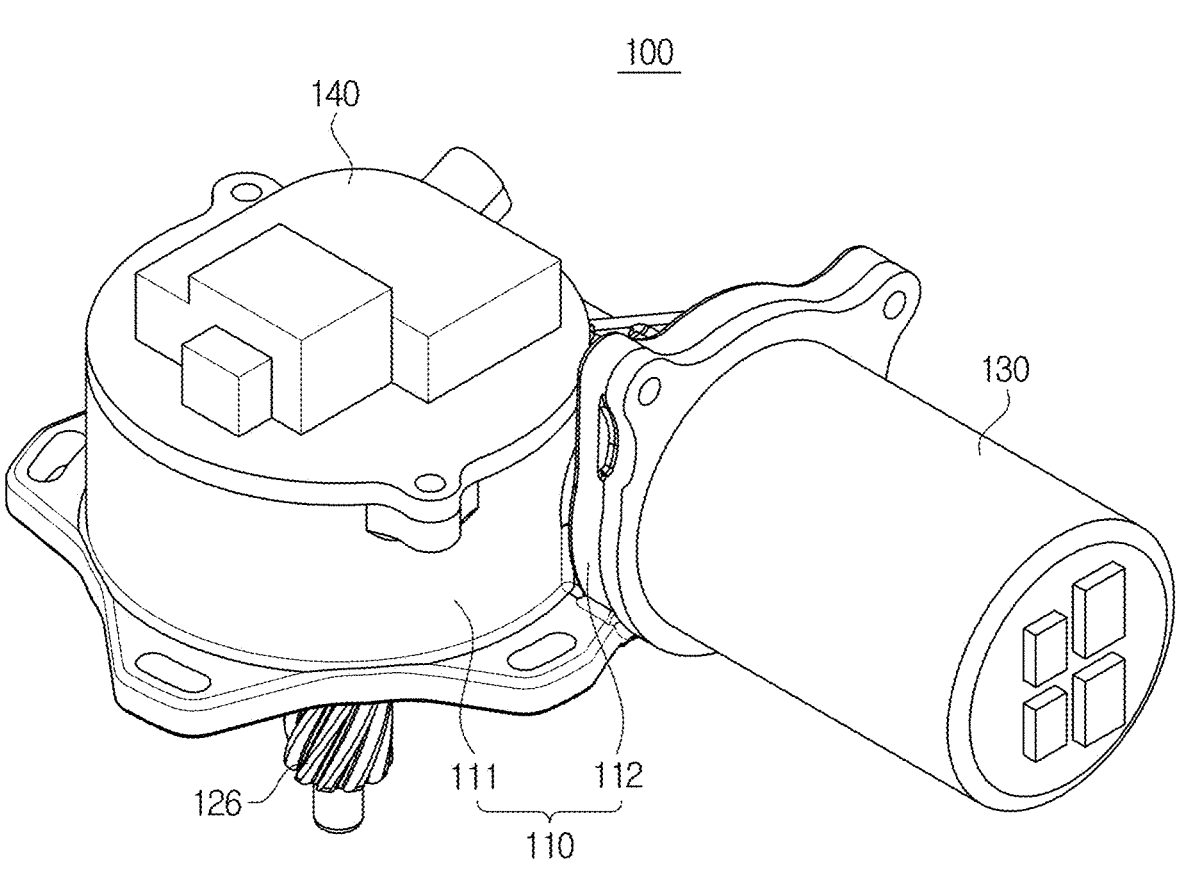
FIG. 4 is a perspective view illustrating the electric power steering apparatus to which a sensor mounting structure is applied according to one embodiment of the present disclosure.
Figure 5:
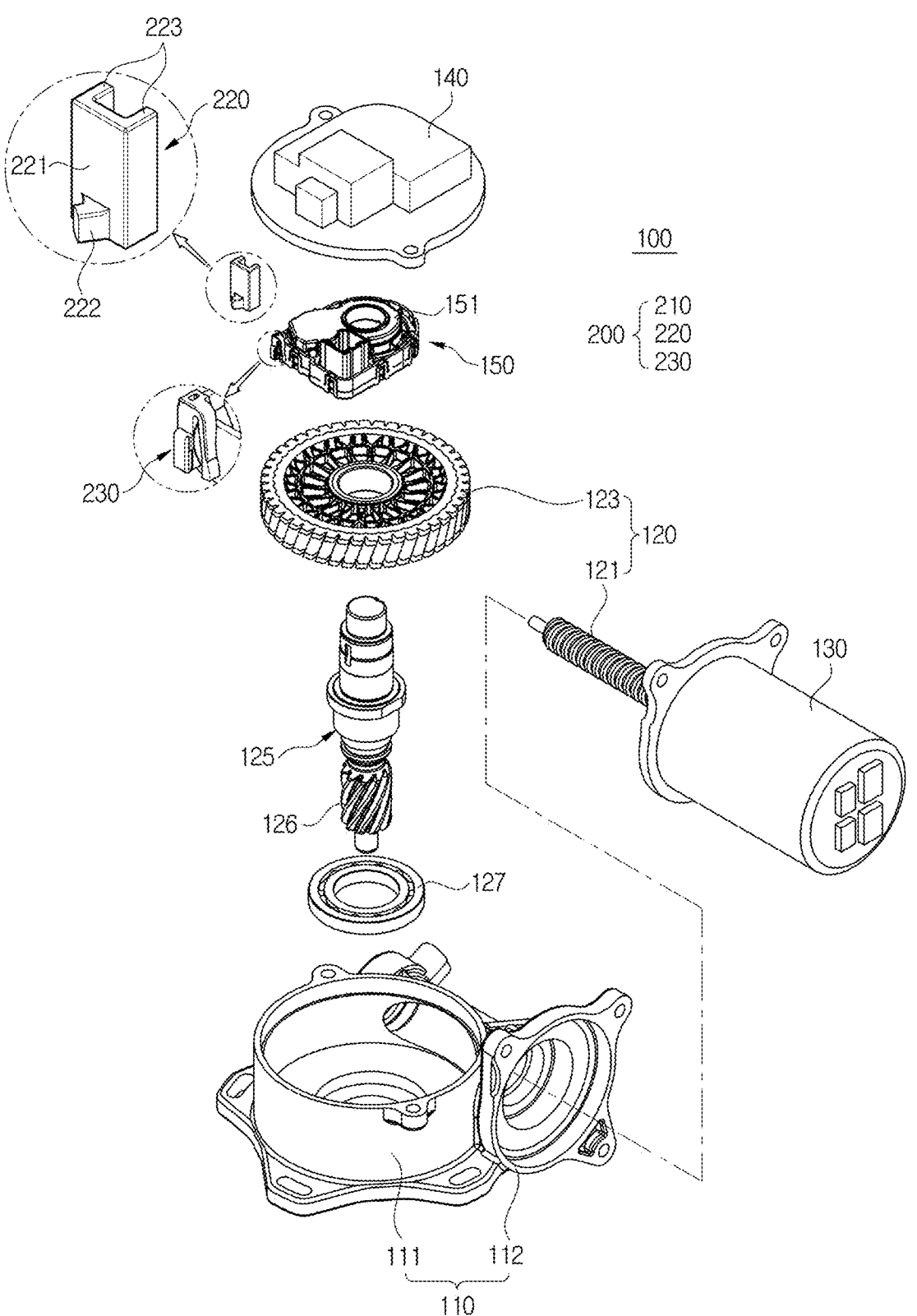
FIG. 5 is an exploded perspective view of that in FIG. 4.
Figure 6:
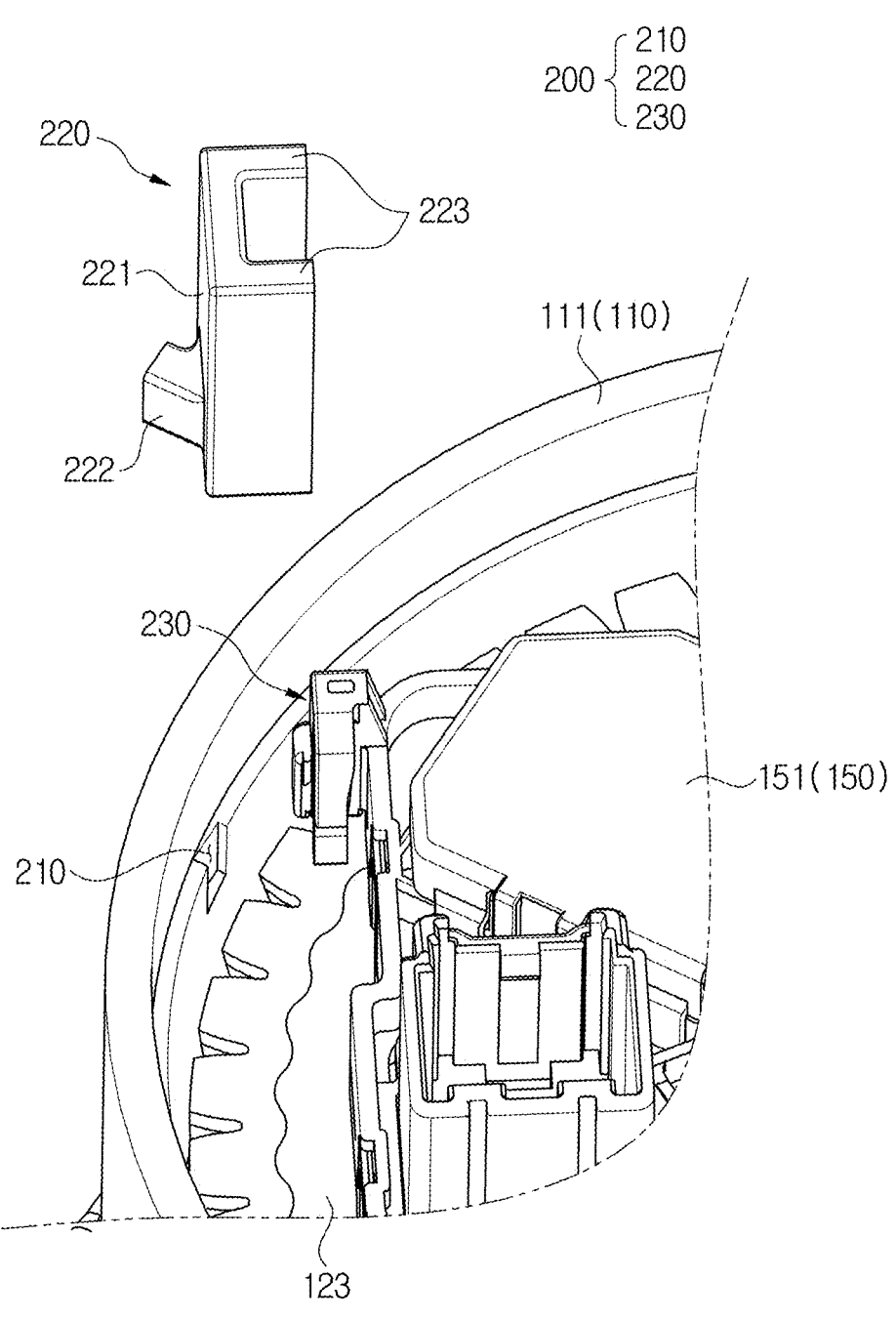
FIG. 6 is a partially enlarged view illustrating a state in which a sensing unit is fixed to a housing through a fastening member included in a sensor mounting structure according to one embodiment of the present disclosure.
Figure 7:
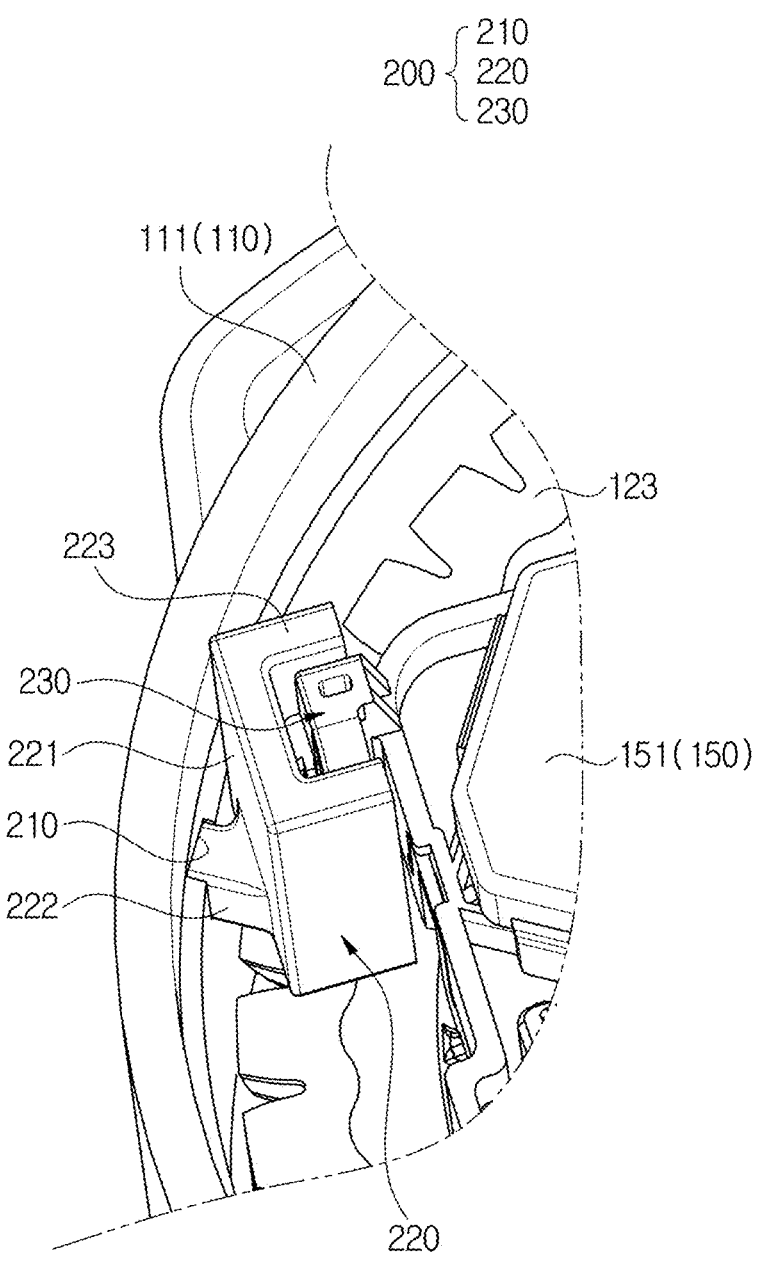
FIG. 7 is an assembly view of that in FIG. 6.
Figure 8:
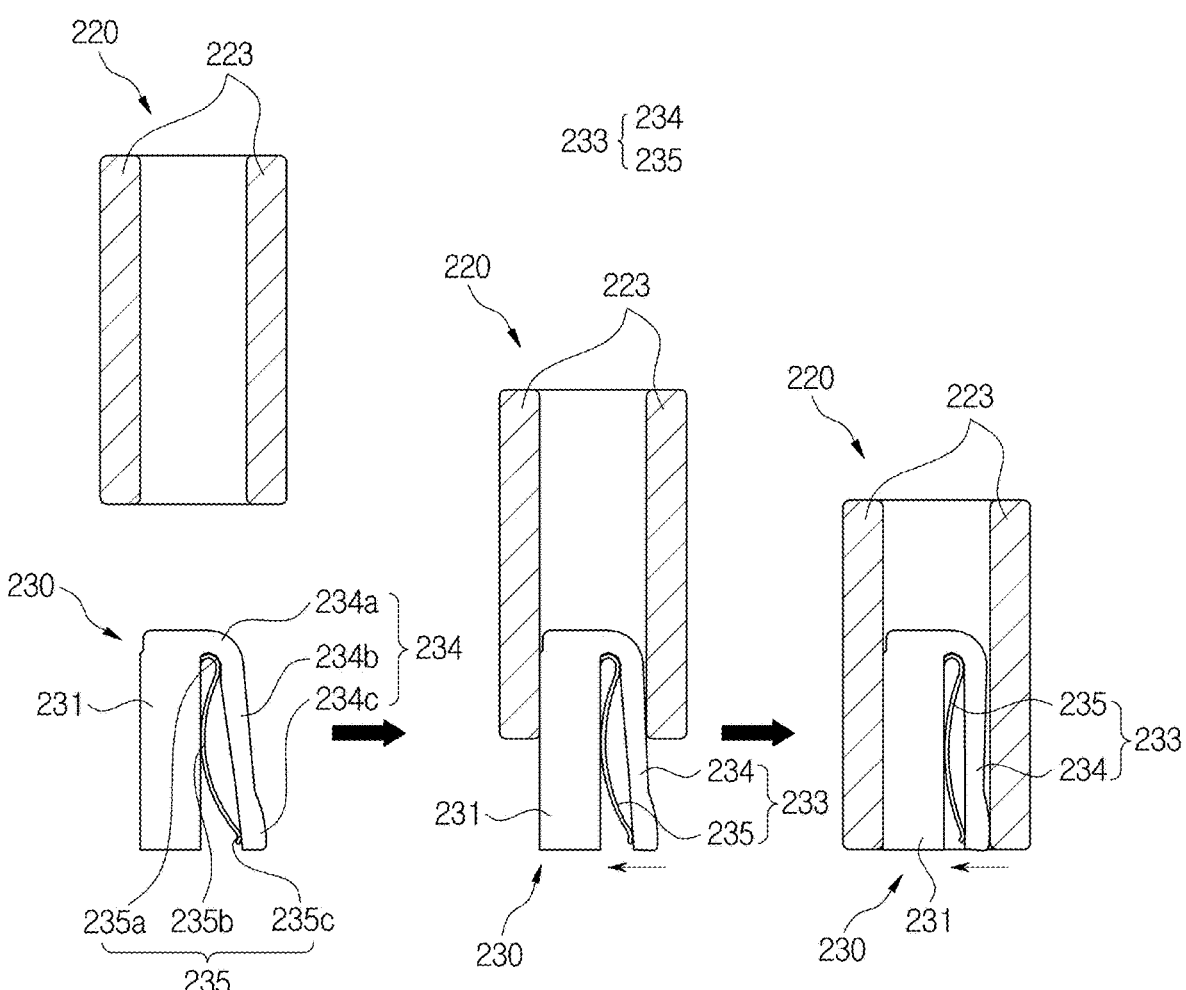
FIG. 8 is a view illustrating a coupling state of the fastening member and a coupling part included in the sensor mounting structure according to one embodiment of the present disclosure.

FIG. 4 is a perspective view illustrating the electric power steering apparatus to which a sensor mounting structure is applied according to one embodiment of the present disclosure, and FIG. 5 is an exploded perspective view of that in FIG. 4. FIG. 6 is a partially enlarged view illustrating a state in which a sensing unit is fixed to a housing through a fastening member included in the sensor mounting structure according to one embodiment of the present disclosure, FIG. 7 is an assembly view of that in FIG. 6, and FIG. 8 is a view illustrating a coupling state of the fastening member and a coupling part included in the sensor mounting structure according to one embodiment of the present disclosure.

Referring to FIGS. 4 to 8, the electric power steering apparatus 100 according to one aspect of the present disclosure may include a housing 110 in which a reducer 120 is accommodated, a housing cover 140 coupled to the housing 110, a motor 130 for providing a rotational force to the reducer 120, a sensing unit 150 provided in the housing 110, and a fastening means 200 for fixing the sensing unit 150 to the housing 110.

The reducer 120 is for amplifying power generated by the motor 130 to transmit the amplified power to the rack (not shown) and may include a worm shaft 121 and a worm wheel 123.

The worm shaft 121 is connected to a motor shaft to be rotated when the motor 130 is driven. A worm gear is formed on an outer circumferential surface of the worm shaft 121.

Gear teeth engaged with the worm gear are formed on the outer circumference of the worm wheel 123. An output shaft 125 on which the pinion gear 126 is formed is coupled to a center of the worm wheel 123. That is, the worm wheel 123 is rotated with the output shaft 125 by a rotational force transmitted from the worm shaft 121, and the rack engaged with the pinion gear 126 moves in a lateral direction to assist the driver manipulate the handle 20 (see FIG. 3).

The worm wheel 123 and the worm shafts 121 are accommodated in a first accommodation part 111 and a second accommodation part 112 of the housing 110, respectively. That is, the first accommodation part 111 and the second accommodation part 112 are provided to partially communicate with each other, and the worm wheel 123 is engaged with the worm shaft 121 in a portion in which the first accommodation part 111 communicates with the second accommodation part 112.

One side surface of the first accommodation part 111 is open to accommodate the worm wheel 123 in an axial direction of the worm wheel 123 as illustrated in the drawings, and the housing cover 140 is coupled to the open one side surface of the first accommodation part 111. As the housing cover 140 is coupled thereto, the open one side surface of the first accommodation part 111 is closed, and the sensing unit 150 is provided between the housing cover 140 and the first accommodation part 111. The output shaft 125 coupled to the center of the worm wheel 123 passes through the other side surface of the first accommodation part 111 of the housing 110 and is connected to the rack and rotatably supported by a bearing 127 in the first accommodation part 111.

Meanwhile, a fastening groove 210 is formed in an inner surface of the first accommodation part 111. The fastening groove 210 will be described below again as one of the fastening means 200 for fixing the sensing unit 150 to the housing 110.

The motor 130 is coupled to the second accommodation part 112 so that the worm shaft 121 coupled to the motor shaft is inserted into the second accommodation part 112. Accordingly, an open one side surface of the second accommodation part 112 is closed by the motor 130.

The sensing unit 150 is connected to the output shaft 125 such that the sensing unit 150 is spaced a predetermined distance from and faces the worm wheel 123. The sensing unit 150 may be provided as an angle sensor for measuring a rotation angle of the worm wheel 123 which rotates when the motor 130 is driven, or a torque angle sensor capable of detecting a torque and a rotation angle using one sensor. The sensing unit 150 may be provided to measure the rotation angle of the worm wheel 123 and transmit a detected value to the ECU 30 (see FIG. 3). Since the sensing unit 150 is already widely known technology, a detailed description thereof will be omitted Meanwhile, a coupling part 230 may be formed to protrude from a frame 151 forming an exterior of the sensing unit 150. The coupling part 230 will be described below again as one of the fastening means 200 for fixing the sensing unit 150 to the housing 110.

The fastening means 200 is for fixing the sensing unit 150 to the housing 110 and may include a fastening groove 210 formed in the housing 110, the coupling part 230 provided on the sensing unit 150, and a fastening member 220 coupled to the fastening groove 210 and the coupling part 230.

The fastening groove 210 may be formed to be recessed in the inner surface of the first accommodation part 111. In this case, it is illustrated that the fastening groove 210 is formed to have an inclination on the first accommodation part 111, but the present disclosure is not limited thereto, and the fastening groove 210 may be formed straight in a radius direction of the first accommodation part 111.

The fastening member 220 may include a body part 221, a fastening part 222 formed to extend from one end of the body part 221, and supports 223 formed to extend from the other end of the body part 221.

The body part 221 has a predetermined stiffness and may be formed to have a plate shape.

The fastening part 222 is a part inserted into and coupled to the fastening groove 210 and may be formed to extend and protrude from one end of the body part 221.

The supports 223 may be formed to extend and protrude from the other end of the body part 221 to support two side surfaces of the coupling part 230. That is, the supports 223 may be provided as a pair of supports 223. Accordingly, the pair of supports 223 are formed to extend from two side ends of the body part 221 toward the coupling part 230 to be spaced a predetermined distance from each other.

The body part 221, the fastening part 222, and the pair of supports 223 are integrally formed. Accordingly, the sensing unit 150 is fixed to the housing 110 while a movement of the sensing unit 150 is restricted when coupled to the fastening groove 210 and the coupling part 230 using the fastening member 220.

The coupling part 230 may be formed to protrude from the frame 151 forming the exterior of the sensing unit 150. In this case, the coupling part 230 may be formed on the frame 151 at a position close to the inner surface of the first accommodation part 111. More specifically, the coupling part 230 may include a coupling body 231 provided between the pair of supports 223 and an elastic member 233 formed on any one side surface of two side surfaces of the coupling body 231.

The coupling body 231 is formed to protrude from the frame 151 toward the housing 110, that is, the inner surface of the first accommodation part 111. The coupling body 231 may be integrally formed with the frame 151.

The elastic member 233 may be provided to be elastically deformed when the pair of supports 223 are coupled to the coupling body 231. The elastic member 233 may include a first elastic part 234 formed to extend downward from an upper side of the coupling body 231 to have an inclination and a second elastic part 235 provided between the first elastic part 234 and the coupling body 231 to elastically support the first elastic part 234.

The first elastic part 234 may include a bending part 234*a* bent from the coupling body 231, an elastic arm 234*b* formed to extend from the bending part 234*a*, and a round part 234*c* having a greater thickness than the elastic arm 234*b* and formed on an end portion of the elastic arm 234*b*.

The second elastic part 235 is formed to extend downward from the coupling body 231 and may include a bent part 235*a* bent from the coupling body 231, a first elastic contact part 235*b* extending to be curved from the bent part 235*a* and provided in contact with the coupling body 231, and a second elastic contact part 235*c* extending to be curved from the first elastic contact part 235*b* and provided in contact with the first elastic part 234.

Accordingly, when the pair of supports 223 are coupled to the coupling part 230, any one support 223 of the pair of supports 223 is guided along one side surface of the coupling body 231, in which the elastic member 233 is not provided, and coupled to the coupling part 230, and the other support 223 presses the elastic member 233 and is coupled to the coupling part 230. Accordingly, the elastic member 233 is pressed by the support 223 and elastically deformed toward the coupling body 231. According to FIG. 8, when the elastic member 233 is elastically deformed, the first elastic part 234 is elastically deformed toward the coupling body 231 from the bending part 234*a* as being pressed by the supports 223, and in the second elastic part 235, due to press caused by the elastic deformation of the first elastic part 234, the first elastic contact part 235*b* and the second elastic contact part 235*c* are elastically deformed to provide an elastic restoring force to the first elastic part 234. Accordingly, a firm coupling state between the fastening member 220 and the coupling part 230 can be maintained. The elastic member 233 may be integrally formed with the coupling body 231.

As described above, the sensing unit 150 may be easily coupled to the housing 110 by inserting the fastening member 220 into the fastening groove 210 and the coupling part 230 through one assembly process. Accordingly, ease of assembly can be secured because a separate assembly tool is not used when compared to the convention case, and a packaging function can also be improved because an increase in total length does not occur.

As is apparent from the above description, a sensor mounting structure of an electric power steering apparatus and an electric power steering apparatus having the same according to one embodiment of the present disclosure has effects of reducing a total length and improving packaging performance by fixing a sensing unit to a housing when compared to a conventional case.

As described above, although the present disclosure has been described with reference to limited specific embodiments and drawings, the present disclosure is not limited thereto, and various modifications and changes may be made by those skilled in the art in the technical spirit of the present disclosure, the scope defined in the claims, and equivalents thereof.

What is claimed is:

1. A sensor mounting structure of an electric power steering apparatus, the sensor mounting structure comprising:
   a housing including a first accommodation part of which one side surface is open to accommodate a worm wheel and a second accommodation part configured to communicate with the first accommodation part and accommodate a worm shaft;
   a sensing unit disposed such that the sensing unit is spaced a predetermined distance from and faces the worm wheel; and
   a fastening means configured to fix the sensing unit to the housing,
   wherein the fastening means includes:
      a coupling part formed to protrude from a frame forming an exterior of the sensing unit;
      a fastening groove formed to be recessed in an inner surface of the first accommodation part; and
      a fastening member of which one end is coupled to the coupling part and an other end is coupled to the fastening groove.

2. The sensor mounting structure of claim 1, wherein the fastening member includes:
   a body part;
   a fastening part formed to extend from one end of the body part and fitted into and coupled to the fastening groove; and
   a pair of supports formed to extend from an other end of the body part and support two side surfaces of the coupling part.

3. The sensor mounting structure of claim 2, wherein the coupling part includes:
   a coupling body provided between the pair of supports; and
   an elastic member formed on any one side surface of two side surfaces of the coupling body and provided to be elastically deformed when the pair of supports are coupled to the coupling body.

4. The sensor mounting structure of claim 3, wherein the elastic member is integrally formed with the coupling body.

5. The sensor mounting structure of claim 3, wherein the elastic member includes:
   a first elastic part formed to extend downward from an upper side of the coupling body to have an inclination; and
   a second elastic part provided between the first elastic part and the coupling body to elastically support the first elastic part.

6. The sensor mounting structure of claim 5, wherein the first elastic part includes:

a bending part bent from the coupling body;
   an elastic arm formed to extend from the bending part; and
   a round part having a greater thickness than the elastic arm and formed on an end portion of the elastic arm.

7. The sensor mounting structure of claim 5, wherein the second elastic part is formed to extend downward from the coupling body and includes:
   a bent part bent from the coupling body;
   a first elastic contact part extending to be curved from the bent part and provided in contact with the coupling body; and
   a second elastic contact part extending to be curved from the first elastic contact part and provided in contact with the first elastic part.

8. An electric power steering apparatus comprising:
   a housing including a first accommodation part of which one side surface is open to accommodate a worm wheel coupled to an output shaft and a second accommodation part configured to communicate with the first accommodation part and accommodate a worm shaft engaged with the worm wheel;
   a motor coupled to the worm shaft to provide a rotational force to the worm wheel through the worm shaft;
   a housing cover coupled to the one side surface of the first accommodation part;
   a sensing unit disposed such that the sensing unit is spaced a predetermined distance from and faces the worm wheel; and
   a fastening means configured to fix the sensing unit to the housing,
   wherein the fastening means includes:
      a coupling part formed to protrude from a frame forming an exterior of the sensing unit;
      a fastening groove formed to be recessed in an inner surface of the first accommodation part; and
      a fastening member of which one end is coupled to the coupling part and an other end is coupled to the fastening groove.

9. The electric power steering apparatus of claim 8, wherein the fastening member includes:
   a body part;
   a fastening part formed to extend from one end of the body part and fitted into and coupled to the fastening groove; and
   a pair of supports which are formed to extend from an other end of the body part and supports two side surfaces of the coupling part.

10. The electric power steering apparatus of claim 9, wherein the coupling part includes:
   a coupling body provided between the pair of supports; and
   an elastic member formed on any one side surface of two side surfaces of the coupling body and provided to be elastically deformed when the pair of supports are coupled to the coupling body.

11. The electric power steering apparatus of claim 10, wherein the elastic member is integrally formed with the coupling body.

12. The electric power steering apparatus of claim 10, wherein the elastic member includes:
   a first elastic part formed to extend downward from an upper side of the coupling body to have an inclination; and
   a second elastic part provided between the first elastic part and the coupling body to elastically support the first elastic part.

13. The electric power steering apparatus of claim 12, wherein the first elastic part includes:

a bending part bent from the coupling body;

an elastic arm formed to extend from the bending part; and a round part having a greater thickness than the elastic arm and formed on an end portion of the elastic arm.

14. The electric power steering apparatus of claim 12, wherein the second elastic part formed to extend downward from the coupling body includes:

a bent part bent from the coupling body;

a first elastic contact part extending to be curved from the bent part and provided in contact with the coupling body; and a second elastic contact part extending to be curved from the first elastic contact part and provided in contact with the first elastic part.

\* \* \* \* \*